(12) United States Patent
Chhabra et al.

(10) Patent No.: US 7,392,518 B1
(45) Date of Patent: Jun. 24, 2008

(54) ROBUST REMOTE FLASH ROM UPGRADE SYSTEM AND METHOD

(75) Inventors: Pankaj Chhabra, Sunnyvale, CA (US); Anand Rajagopalan, Santa Clara, CA (US)

(73) Assignee: 3Com Corporation, Marlborough, MA (US)

( * ) Notice: Subject to any disclaimer, the term of this patent is extended or adjusted under 35 U.S.C. 154(b) by 681 days.

(21) Appl. No.: 10/080,931

(22) Filed: Feb. 21, 2002

(51) Int. Cl.
   *G06F 9/44* (2006.01)
   *G06F 9/00* (2006.01)
   *G06F 1/24* (2006.01)

(52) U.S. Cl. .......... 717/168; 717/173; 713/2; 713/100

(58) Field of Classification Search ......... 717/168–173; 713/2, 100
   See application file for complete search history.

(56) References Cited

U.S. PATENT DOCUMENTS

| | | | | |
|---|---|---|---|---|
| 6,009,524 A * | 12/1999 | Olarig et al. | ............... | 713/200 |
| 6,230,319 B1 * | 5/2001 | Britt et al. | ................ | 717/173 |
| 6,467,087 B1 * | 10/2002 | Yang | ................ | 717/168 |
| 6,470,496 B1 * | 10/2002 | Kato et al. | ................ | 717/173 |
| 6,473,899 B1 * | 10/2002 | Nelson et al. | ............... | 717/173 |
| 6,584,559 B1 * | 6/2003 | Huh et al. | ................ | 713/2 |
| 6,640,334 B1 * | 10/2003 | Rasmussen | ................ | 717/171 |
| 6,732,267 B1 * | 5/2004 | Wu et al. | ................ | 713/100 |
| 6,854,009 B1 * | 2/2005 | Hughes | ................ | 709/220 |
| 7,093,244 B2 * | 8/2006 | Lajoie et al. | ............... | 717/168 |
| 2003/0028766 A1 * | 2/2003 | Gass et al. | ................ | 713/164 |
| 2003/0182414 A1 * | 9/2003 | O'Neill | ................ | 709/223 |

* cited by examiner

*Primary Examiner*—Meng-Al T. An
*Assistant Examiner*—Jennifer N. To

(57) ABSTRACT

The present invention is a solution that provides reliable and robust boot upgrade system and method. A power up boot process is performed in which a boot update application monitors for an indication of available update information and an update setup process is engaged in which an upgrade indication variable is set to a value indicating an upgrade is required and the upgrade indication variable continues to indicate an upgrade is required until an upgrade is successfully completed. An update reboot process is executed which retrieves updated information from a central management station and a boot loader routine reads an upgrade indication variable and repeatedly downloads the updated information until the upgrade indication variable indicates there is no pending update download required. The upgrade indication variable is changed to indicate no pending update download is required when a download is verified and authenticated.

10 Claims, 5 Drawing Sheets

300

310
Create updated boot information at a centralized location.

320
Initiate contact with a target device.

330
Forward updated informatin to a target device.

FIG 3

ROBUST REMOTE FLASH ROM UPGRADE SYSTEM AND METHOD

BACKGROUND OF THE INVENTION

1. Field of the Invention

This invention relates to the field of computer system upgrades. More particularly, the present invention relates to a robust remote memory upgrade system and method.

2. Related Art

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data in most areas of business, science, education and entertainment. Frequently, computer systems that provide information processing are needed to realize these advantageous results. Computer systems typically process information in accordance with a set of instructions beginning with boot instructions associated with initial configuration of a computer system. System startup routines, such as a boot process, typically initialize various settings within the computer system. As systems advance and applications become more complex there is usually a need for updating information in the system. However, providing updated information such as boot data is often very complex and traditionally susceptible to errors.

It is very important for boot up routines to be performed correctly and accurately. One of the fundamental desirable characteristics of a computer system is to provide reliable and predictable results. Reliability usually depends upon accurate initialization of the system. Most devices that include processors (such as computer systems, switches, routers, hubs, network adapters, gateways, etc.) that perform operations in accordance with a defined series of instructions require the system to start at a predetermined state or configuration. If the system does not start out with the correct setup information the processes will not start at an anticipated state and typically be misaligned for the remainder of the operations. Inappropriate or erroneous start up information usually produces unreliable and/or incomprehensible results and often causes system crashes. An accurate initialization establishes settings to ensure that processes commence from a predetermined known state. During a computer system power up, the processor typically starts executing instructions from a specific location in a read only memory (ROM) that includes boot instructions. This memory area (e.g., in a flash ROM) and its associated instructions is usually referred to as the boot loader. The boot loader performs a power on self-test (POST) on the system and loads the operating system (OS or firmware) stored in the flash.

Updating firmware information such as boot instructions is typically susceptible to a variety of difficulties. In particular there are a variety of interruptions to the update that often result in the occurrence of an inconsistent state being entered during a boot process. There are a variety of interruptions such as a power loss, communication loss, or other disruptions to the upgrade that result in error conditions in the update of firmware or boot information. For example, if only a portion of an update is loaded and another portion is not it typically results in an inconsistent state in the boot routine and the device usually has to be sent to the manufacturer for servicing to correct the problem.

Traditional attempts at updating the boot information or operating system (OS) firmware residing in a ROM (e.g., a flash ROM) typically lack desirable levels of robustness. For example, traditional approaches running over the firmware (in a product) attempt to obtain an updated flash image and program this image on the target device. However, these traditional approaches do not typically handle error conditions such as power loss, unplugging of power by the user, or other disruptions to the upgrade process that make the product unbootable and often completely disabled. Users typically have to send the target device product back to the factory to replace the flash ROM component. In addition, the traditional update attempts typically consume significant amounts of valuable RAM space.

Local update techniques are another way of traditionally attempting to update boot information. Local update techniques usually involved locally connecting a target device (e.g., computer system) to a second computer system using a serial cable/terminal and upgrading the ROM using a terminal application running on the second computer system. This approach does not provide the advantages of remote upgrading capabilities and does not typically provide enough robustness to handle boot upgrade interruptions. Local upgrade techniques typically require resources to be transported to multiple locations and are more susceptible to maintenance problems.

Thus, what is required is a solution that provides a reliable and robust boot upgrade system and method.

SUMMARY OF THE INVENTION

The present invention is a solution that provides a reliable and robust boot upgrade system and method. In one embodiment of the present invention a remote upgrade method facilitates remote robust updating of firmware and boot instructions. In one exemplary implementation, a remote upgrade method utilizes an indication of a pending upgrade to confirm that update boot information is available and does not change the indication until the updated information is successfully downloaded. In one embodiment, a boot process is performed in which a boot update application monitors for an indication of available update information. If there is an indication of available update information an update setup process is engaged in which an upgrade indication variable is set to a value indicating an upgrade is required when an indication of available update information is received and the upgrade indication variable continues to indicate an upgrade is required until an upgrade is successfully completed. An update reboot process is executed utilizing the updated information. In one embodiment of the present invention, the update reboot process enters update mode and retrieves updated information from a central management station. In one exemplary implementation of the present invention, the boot loader routine reads an upgrade indication variable and repeatedly downloads the updated information until the upgrade indication variable indicates there is no pending update download required. The upgrade indication variable is changed to indicate no pending update download is required when a download is verified and authenticated.

BRIEF DESCRIPTION OF THE DRAWINGS

FIG. 3 is a flow chart of a management center update process, one embodiment of the present invention.

DETAILED DESCRIPTION OF THE INVENTION

Figure 1:
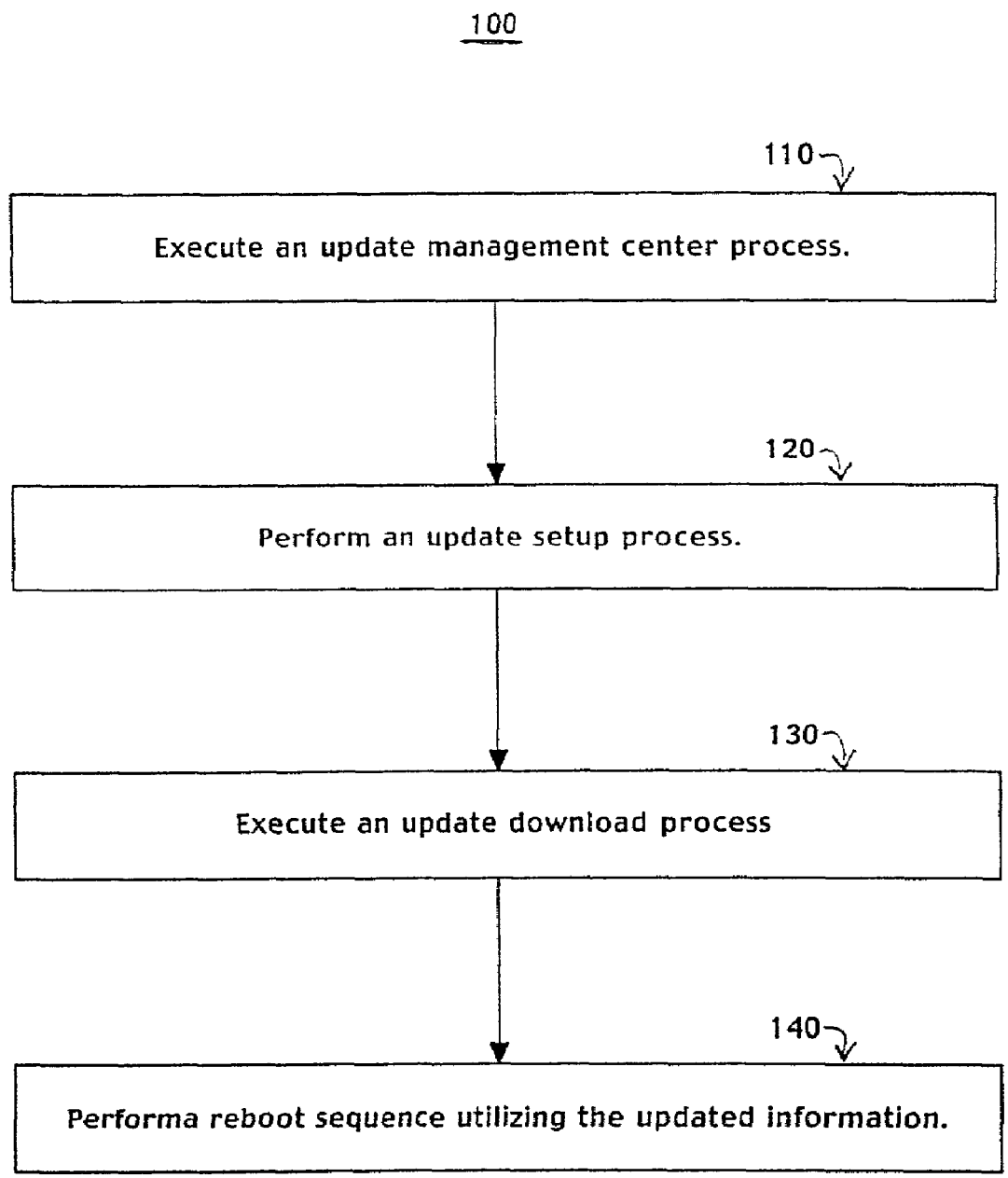
FIG. 1 is a flow chart of a boot information upgrade method, one embodiment of the present invention.

Reference will now be made in detail to the preferred embodiments of the invention, a robust remote flash ROM upgrade system and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

NOTATION AND NOMENCLATURE

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing", "computing", "translating", "calculating", "determining", "scrolling", "displaying", "recognizing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 is a flow chart of boot information upgrade method 100, one embodiment of the present invention. Boot information upgrade method 100 facilitates reliable updating of firmware and boot instructions. In one embodiment of the present invention, boot information upgrade method 100 ensures that available update boot information is successfully downloaded from a remote management center to a target device and avoids inconsistent states associated with update interruptions.

In step 110, an update management center process is executed. In one embodiment of the present invention, the update management center process includes creating boot update information. In one exemplary implementation of the present invention, the update management center is communicatively coupled to target devices and forwards an indication of available updated boot information. For example, a server functioning as an update management center forwards a request for a target device (e.g., a personal computer system at a remote location) to engage in an update process.

In step 120, a target device performs an update setup process. The update setup process sets up the target device configuration to prepare for receiving updated boot information. For example, an update setup process includes tracking information identifying the location of updated boot information and setting a pending update indication variable appropriately (e.g., to indicate boot update information is available and has not been successfully obtained).

In step 130, an update download process is executed. In one embodiment of the present invention, the update download process includes downloading updated boot information from the update management center and storing it in a ROM (e.g., a flash ROM). In one exemplary implementation of the present invention the downloaded updated boot information is store in a write protected section of the ROM, reducing the possibility of the information being accidentally erased. In one embodiment of the present invention, the update boot information download process repeats itself until successfully completed.

In step 140, the target device performs a reboot sequence utilizing the updated information and continues with normal operations.

Figure 2A:
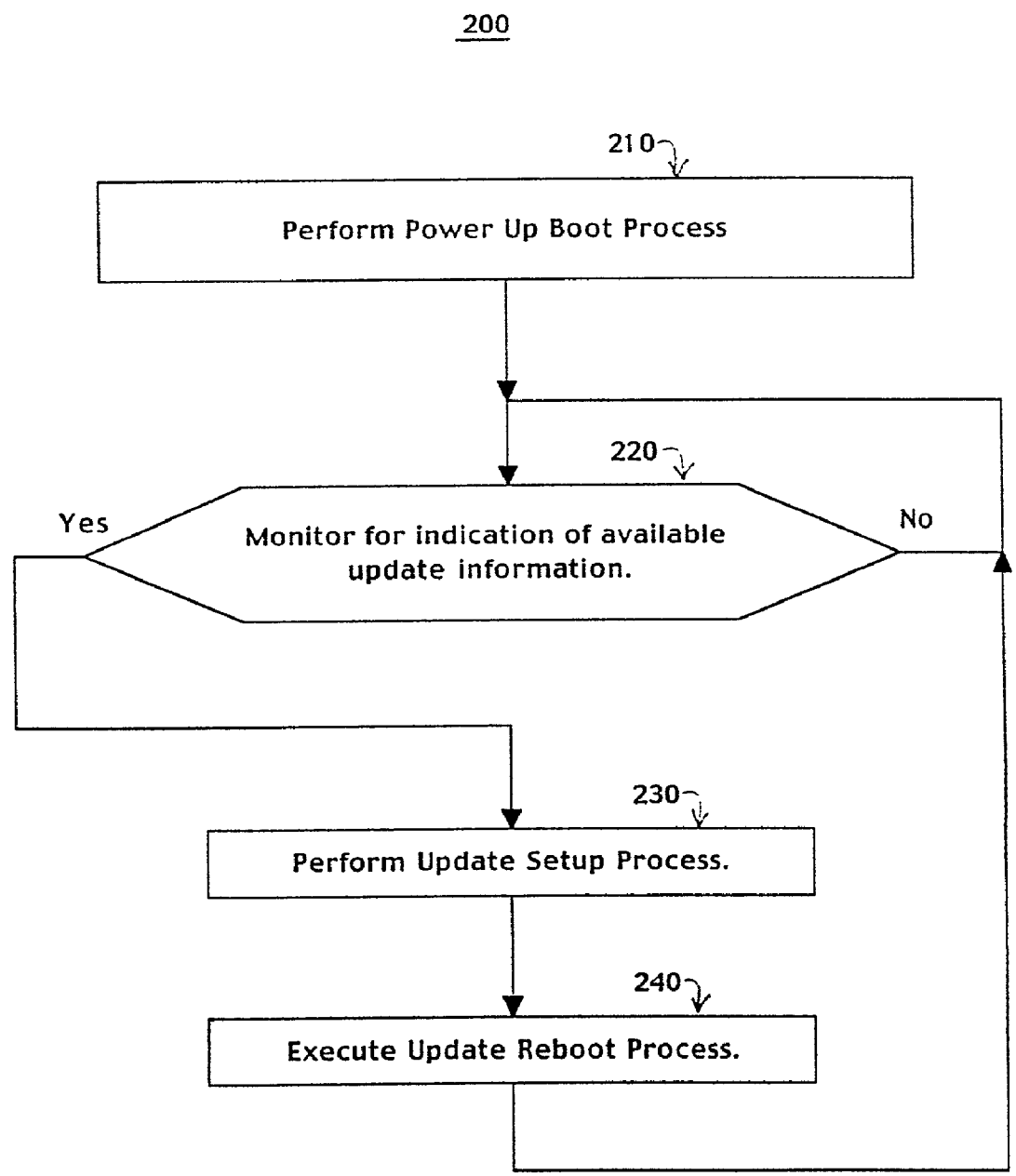
FIG. 2A is a flow chart of a remote upgrade method, one embodiment of the present invention.

FIG. 2A is a flow chart of remote upgrade method 200, one embodiment of the present invention. Remote upgrade method 200 facilitates remote robust updating of firmware and boot instructions. In one embodiment of the present invention, remote upgrade method 200 utilizes indications of pending upgrade requirements to confirm that available update boot information is successfully downloaded.

In step 210 a power up boot process is performed. In one embodiment of the present invention, the power up boot process includes booting up an operating system (O/S) and launching an update application. In one exemplary implementation of the present invention, the update application is a TCP/IP sockets residing on a target device.

In step 220, a boot update application monitors for an indication of available update information. In one embodiment of the present invention, a TCP/IP sockets application waits for a request (e.g., from a management station that is accessible via the internet) to engage in an update process. For example, when the management station wants to upgrade a ROM or flash, it sends an update request message to a boot update application (e.g., residing on a remote target device). The update request message includes an indication of the updated boot information location. In one exemplary implementation, the location indication is an IP address of a management station and name of the updated boot file name comprising the updated information stored on the management station. If there is a not an indication of available update information (e.g., request to engage in an update process) the process jumps to step 250. If there is an indication of available update information the process proceeds to step 220.

In step 230, an update setup process is engaged. In one embodiment of the present invention, the update setup process includes tracking indication of update status and storing the location of upgrade information. In one embodiment of the present invention, an upgrade indication variable (e.g., FlashUpgrade) is set to a value indicating an upgrade is required (e.g., a non zero value) when an indication of available update information is received. In one embodiment of the present invention, the upgrade indication variable continues to indicate an upgrade is required until an upgrade is successfully completed. In one embodiment of the present invention, information indicating the location of the updated boot information is stored. In one exemplary implementation, the received at internet protocol (IP) address of a management station server and update information file name are stored as values for an update location variable (e.g., IPAddress) and an update information file variable (e.g., FlashFileName) in the ROM (e.g., a flash ROM).

In step 240, an update reboot process is executed. In one embodiment of the present invention, the update reboot process enters update mode and retrieves updated information from a central management station. In one exemplary implementation of the present invention, the boot loader routine reads an upgrade indication variable and repeatedly downloads the updated information until the upgrade indication variable indicates there is no pending update download required. The upgrade indication variable is changed to indicate no pending update download is required when a download is verified and authenticated. In one embodiment of the present invention, an update application performs a graceful exit from running operations and for a short period of time network connectivity may be lost during the reboot.

Figure 2B:
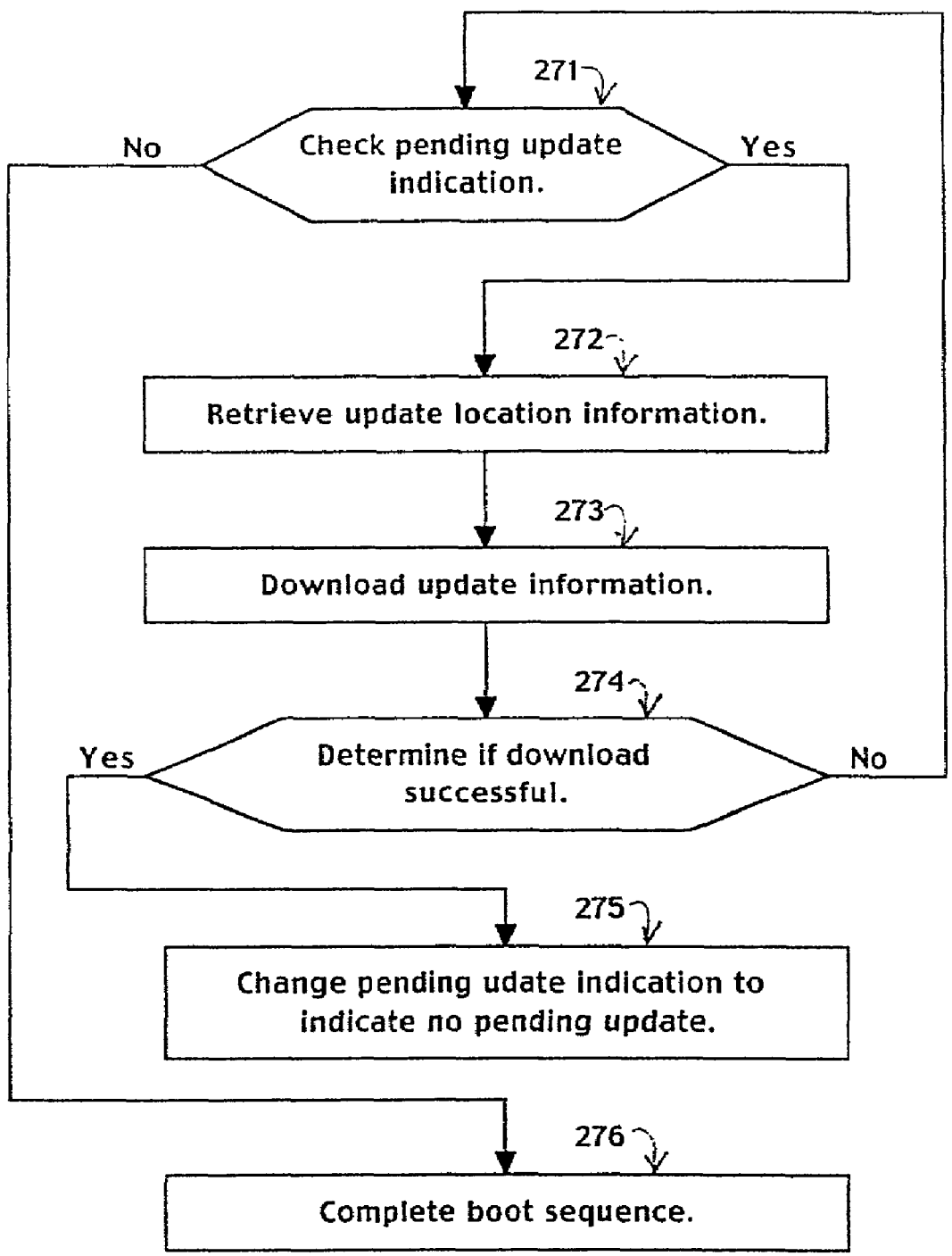
FIG. 2B is a flow chart of an update reboot process included in one embodiment of the present invention.

FIG. 2B is a flow chart of update reboot process 270, one embodiment of an update reboot process executed in step 240.

Upon reboot a target processor begins to execute a boot loader routine and checks a pending update indication in step 271. In one embodiment of the present invention, the boot loader routine reads an upgrade indication variable (e.g., FlashUpgrade). If the upgrade indication variable is set to indicate an upgrade is not pending the process proceeds to step 276. If the upgrade indication variable is set to indicate an upgrade is pending the process proceeds to step 271.

In step 272, update location information is retrieved. In one embodiment of the present invention the management station identifier (e.g., IP address) and update information file name (e.g., FlashFileName) variables (e.g., from the flash) are read (e.g., by a boot loader routine).

In step 273 update information is downloaded. In one embodiment of the present invention a connection is made to the indicated management station (e.g., via the IP address) and the information from the update information file is retrieved. The received updated boot information is programmed to flash.

In step 274 a determination is made if the download was successful. In one embodiment of the present invention, the received updated boot information is authenticated. In one exemplary implementation, the authentication mechanism is a public key that prevents loading of "illegal" images that may contain Trojan horses or other viruses, or even corrupted flash images. This provides the device with additional security. For example, downloaded information is signed by private key and checked with a public key which is stored in the section of the flash that is never rewritten, preventing the public key from being corrupted accidentally. The present invention is readily adaptable to a variety of authentication methods including hash, MP5, CRC, check sum, etc.

In step 275 the pending update indication is set to indicate there is no pending update and return to step 271. In one embodiment of the present invention, an update application sets the upgrade indication variable (e.g., FlashUpgrade) to indicate no update is required (e.g., a zero value) and awaits future requests for update downloads. By waiting to change the upgrade indication variable until after the flash is successfully updated the present invention avoids pitfalls associated with error indications associated with power loss, unplugging of power, or other disruption to an upgrade process. For example, an update boot loader sets the variable FlashUpgrade to zero when the flash has been successfully programmed. If before this time there is a loss of power, on restoration of power to the target device, the CPU jumps to the boot loader which reads the variable FlashUpgrade still at non-zero and starts again at step 271 until successful.

In step 276 the boot sequence is completed. For example, a CPU on the target device executes an update boot loader, which loads the OS/Firmware (with the last updated information) since there is no indication of a pending upgrade (e.g. FlashUpgrade variable has a zero value) and the device is booted using the latest available OS/Firmware image.

FIG. 3 is a flow chart of management center update process 300, one embodiment of the present invention. In one embodiment of the present invention, the management center update process facilitates centralized generation and storage of updated information (e.g., updated boot information). Management center update process 300 also facilitates convenient and efficient distribution of updated information to a variety of remote target devices. In one exemplary implementation of the present invention, the updated information is distributed via Internet connections to target devices.

In step 310, updated boot information is created at a centralized location (e.g., a management station). In one exemplary implementation, a central management station receives updated boot information input from a design group.

In step 320, contact with target devices is initiated. The contact with the target devices indicates there is updated information. In one embodiment of the present invention a management station initiates the contact with a device and requests the device to receive updated information. In one embodiment of the present invention a central management station initiates the contact with the device and monitors for requests to download boot information. In one embodiment of the present invention, the contact includes information necessary to access the updated information. In one exemplary implementation of the present invention, a central management station (e.g., a server) forwards an IP address of the central management station and a file name (e.g., in a file name variable) of the file comprising the updated boot information.

In step 330 updated information is forwarded and loaded onto the device. In one embodiment of the present invention the information is forwarded via the internet. In one exemplary implementation of the present invention the information is forwarded with a public key for authentication.

Figure 4:
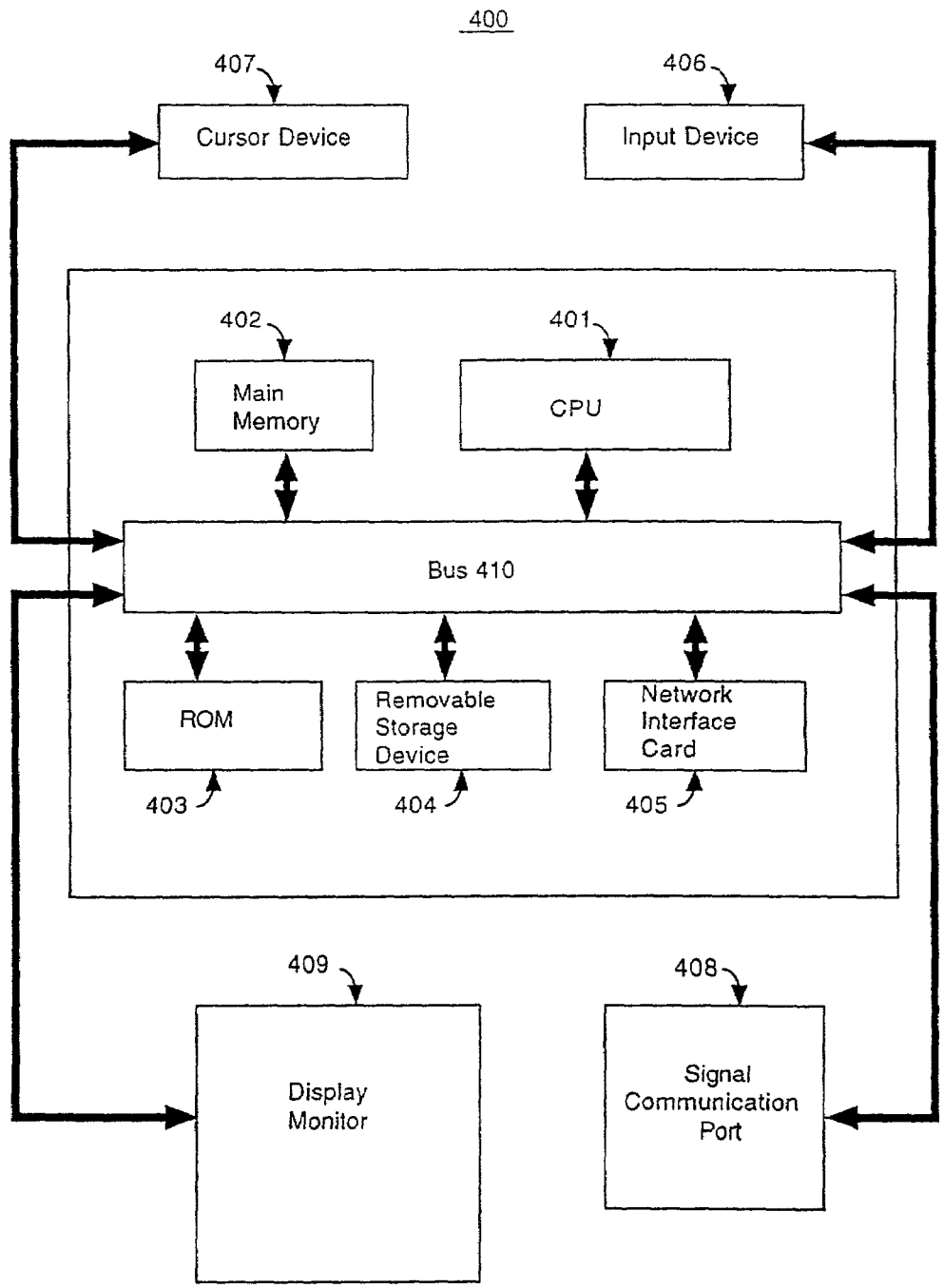
FIG. 4 is a block diagram of a computer system on which one embodiment of the present invention is implemented.

FIG. 4 is a block diagram of computer system 400, one embodiment of a computer system upon which the present invention is implemented. Computer system 400 includes address/data bus 410, central processor 401, main memory 402 (e.g., random access memory), static memory 403 (e.g., read only memory), removable data storage device 404, network interface card (NIC) 405, input device 406 cursor device 407, display monitor 409, and signal communications port 408. Address/data bus 410 is coupled central processor unit 401, main memory 402, static memory 403, removable data storage device 404, network interface card 405, input device 406 cursor device 407, display monitor 409, and signal communications port 408.

The components of computer system 400 cooperatively function to provide a variety of functions, including implementation of a remote upgrade method. Address/data bus 410 communicates information, central processor 410 processes information and instructions, main memory 402 stores information and instructions for the central processors 401 and static memory 403 stores static information and instructions, including updated boot information. Removable data storage device 404 provides also stores information and instructions (e.g., functioning as a large information reservoir). NIC 405 coordinates the communication of information to and from computer system 400 via signal communication port 408. Display device 409 displays information. Cursor device provides a mechanism for pointing to or highlighting information on the display device. Input device 406 provides a mechanism for inputting information.

Thus, the present invention is a solution that provides reliable and robust boot upgrade system and method. Utilizing the present invention to upgrade a ROM (e.g., a flash ROM) prevents situations where a corrupted image disables a device to the point where it has to be returned to the factory to be fixed. In one embodiment of the present invention, boot information upgrade method 100 ensures that available update boot information is successfully downloaded from a remote management center to a target device and avoids inconsistent states associated with update. The present invention continues to monitor a pending update indicator (e.g., FlashUpgrade variable) for an indication that an update is required and does not change the indication until after a successful update has been complete. If the upgrade is not successful the boot loader re-enters the upgrade mode and continues to do so until the flash has been programmed correctly and the pending update indicator is changed.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical, application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A remote upgrade method comprising:
   receiving from a remote source, at a device including a flash memory, an indication of available update information from the remote source, the indication including a location and a file name of an updated flash image to replace a current flash image stored in the flash memory and utilized by the device, wherein the location is an internet protocol (IP) address of the remote source;
   setting, in response to receiving the indication, an upgrade indication variable in the device to indicate an updated flash image is available at the remote source;
   downloading the updated flash image from the remote source to the flash memory;
   setting, only if the downloading is completed, the upgrade indication variable in the device to indicate no updated flash image is available at the remote source; and
   executing, by the device, a reboot process utilizing the updated flash image if the upgrade indication variable is set to indicate no updated flash image is available, otherwise utilizing the current flash image and repeating the downloading.

2. The method of claim 1, wherein an update indication variable having a value of zero indicates no updated flash image is available at the remote source.

3. The method of claim 1 wherein an update indication variable having a non zero value indicates an updated flash image is available at the remote source.

4. The method of claim 1, wherein the updated flash image is stored in read-only flash memory in the device.

5. The method of claim 1, further comprising:
   authenticating the updated flash image to the device.

6. The method of claim 5, wherein the authenticating is performed with a public—private key pair.

7. The method of claim 1, wherein the current flash image includes processor boot instructions.

8. The method of claim 7, wherein the updated flash image includes updated processor boot instructions.

9. The method of claim 1, wherein the current flash image includes firmware utilized by the device.

10. The method of claim 9, wherein the updated flash image includes updated firmware.

\* \* \* \* \*